Figure 1:
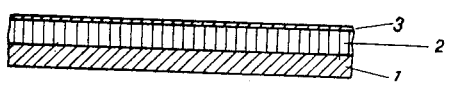

April 22, 1952    H. ARLEDTER ET AL    2,593,829
ELECTRICAL CAPACITOR AND FOIL THEREFOR
Filed May 24, 1949

INVENTORS
Hanns Arledter
Rudolf Engelmann

Patented Apr. 22, 1952

2,593,829

UNITED STATES PATENT OFFICE 2,593,829

ELECTRICAL CAPACITOR AND FOIL THEREFOR

Hanns Arledter, Koln-Kalk, and Rudolf Engelhardt, Leverkusen-Bayerwerk, Germany, assignors to Farbenfabriken Bayer, Leverkusen, Germany Application May 24, 1949, Serial No. 95,002
In Germany January 13, 1949

8 Claims. (Cl. 175—41)

This invention relates to the manufacture of foils for electrical equipment, in particular capacitors.

Capacitors with foils of cylindrical or flat windings, or piled foils so far are made of paper or plastics, also paper foils with metallic surfaces are used. Capacitors manufactured with these foils essentially consist of metal foils having the paper or plastic foils interposed between them to serve as dielectrics and spacers. Since it is technically impossible to manufacture very thin supportless and spotless paper or plastic foils, the foils must be applied in more than one layer yielding relatively large capacitors.

In accordance with the present invention foils for electrical equipment, in particular capacitors, do not show this disadvantage if they are made of a metal foil serving as carrier, the said foil being coated at least on one side with an adhesive dielectric plastic layer, the latter being coated with a second metallic coating. Since the metal foil serves as the carrier it is possible to use very thin dielectric layers having a thickness of, e. g., 10 micron ($\mu$) and less whereby relatively small capacitors can be manufactured. The new foils, however, are not only suitable for capacitors but also for other electrical equipment, for instance, insulating material.

As dielectrics practically all plastics displaying the required dielectric characteristics with or without the addition of softening agents can be used, especially those from which no supportless thin foils can be made because of their imperfect strength, since any plastic from a solution or melt or the like can be applied in a thin layer to the metal foil serving as the carrier. Excellently suitable are the reaction products of polyfunctional isocyanates with polyhydroxy compounds because they display good adhesiveness on the metal foil and a high dielectric constant. As polyfunctional isocyanates, e. g., bivalent isocyanates, such as toluylene-diisocyanate, or trivalent isocyanates, such as triphenylmethane-triisocyanate come in consideration. As trivalent isocyanate also the reaction product of 1 mol of a trivalent alcohol with 3 mols of a bivalent isocyanate may be used. As polyhydroxy compounds preferably branched polyesters containing hydroxyl groups as are obtainable by polycondensation of di-basic acids, such as adipic acid or phthalic acid with trivalent or higher alcohols, such as glycerine or mixtures thereof with bivalent alcohols may be used. In the manufacture of these branched polyesters containing hydroxyl groups the number of hydroxyl groups should preferably slightly exceed the number of carboxyl groups to guarantee that the end groups foremost consist of hydroxyl groups. The branched polyesters containing hydroxyl groups are mostly oily substances or waxes with a low melting point. As polyhydroxy compounds also film-forming plastics containing hydroxyl groups, such as cellulose acetate or mixed polymerisates of vinylchloride with vinyl alcohol come in consideration. In all instances reaction of these polyhydroxy compounds with polyfunctional isocyanates brings about that with the formation of urethane groups the molecules are enlarged and interlacing occurs. The proportion of interlacing and molecular increase can be regulated by varying the quantities of the starting materials. Molecular increase is highest when placing one OH-group on one isocyanate group. If a lower molecular size is desired, preferably not so many isocyanate groups are used. If the plastics displaying an insufficient adhesiveness to smooth metal foils are to be used as dielectric layers according to one feature of the invention metal foil and plastic are toothed, preferably in such a manner that the metal foil is roughened on the surface and/or perforated prior to applying the plastic coating.

Since the foils are of high strength because of the carrying metal foil it is possible according to another feature of the invention to use plastic layers with large amounts of dielectric filling substances having the desired characteristics. Such foils can be used universally in all frequency fields for constructing capacitors.

It is still another feature of the invention that a layer of an inorganic substance is applied to the metal foil and on top of this layer the plastic. In practice this can be performed by producing on the metal foils chemically, cataphoretically, electrophoretically or electrolytically layers of oxide, carbonate and the like. For instance, it is possible to produce layers of $Al_2O_3$ on aluminum foils distinguished by a high dielectric constant of 7.1 and a maximum breakdown voltage of 4000 kv. per cm. and above. It is known from experience that these inorganic dielectric layers have defective spots. The said defects, however, do not show when applying a plastic layer on top of the inorganic layer. That is to say, in this manner the high dielectric constant and high breakdown voltage of the dielectric layers on the basis of metal oxide, carbonate and the like are utilized for foils for electrical equipment.

When using in the manufacture of foils the reaction products of polyhydroxy compounds with polyfunctional isocyanates, capacitors with a tg δ of 0.003–0.01 for low and medium frequency are obtained, whereas when using, e. g., polystyrene capacitors with losses of, e. g., 0.0001–0.0003 for high and medium frequency are obtained. In the ultra short wave field preferably plastics on the basis of polyethylenes are used.

It is also possible to manufacture capacitors for temperatures of more than 150° C. with small dielectric losses for permanent use by employing for the preparation of the lacquer layer, for instance, silicones or polymeric carbon fluorides.

For a fuller understanding of the nature and objects of the invention, reference may be had to the following detailed description, taken in conjunction with the accompanying drawing, in which:

Fig. 1 is a metal foil 1 with a plastic layer 2. On top thereof a metallic layer 3 is applied.

Figure 2:
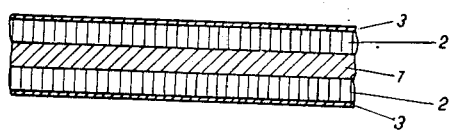

Fig. 2 is a metal foil 1 with a plastic layer 2 applied to both sides and on top thereof metallic layers 3.

Figure 3:
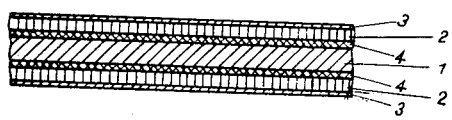

Fig. 3 is a metal foil 1 with a layer of an inorganic compound 4 on both sides. On top of the inorganic compound layers plastic layers 2 with metal layers 3 are applied.

Figure 4:
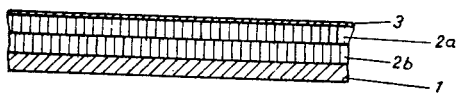

Fig. 4 is a metal foil 1 with a plastic layer 2b upon which latter a second plastic layer 2a is applied. 3 is the metallic layer.

Figure 5:
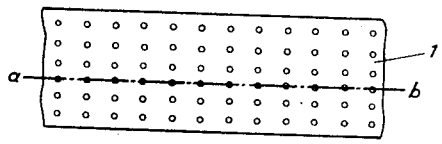

Fig. 5 is a top view of a perforated metal foil.

Figure 6:
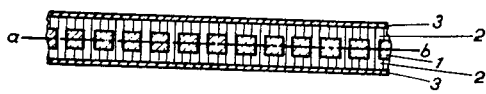

Fig. 6 is a perforated metal foil with plastic layers 2 applied to both sides. 3 is a metallic layer. It is a cut through Fig. 5 along the line a—b. The metallic layer 3 is applied to both sides.

Figure 7:
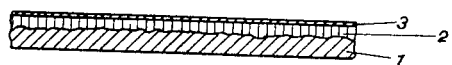

Fig. 7 is a chemically or electrochemically roughened metallic surface 1 upon which a plastic layer 2 is applied on one side. On top of the plastic layer is a metal layer 3.

When using in accordance with the invention plastics with sufficient adhesiveness on smooth or bright metal foils, the process is preferably carried out as follows:

In a continuous working process metal, e. g., aluminium foils of, e. g. 5–6 μ thickness are lacquered once or several times with a dielectrically pure melt or the solution of a reaction product of polyfunctional isocyanates and polyhydroxy compounds by either dipping the foil into the melt or proceeding according to another known coating process. The homogeneous lacquer layer is condensed in a heating channel at temperatures of, e. g., 100–200° C. Upon the metal foil coated on one or both sides with a homogeneous plastic a thin metal layer of, e. g., 0.2–1 μ thickness is applied. Coating can be performed by any chemical or physical process, preferably in a continuous working process, for instance, by vaporizing metal from metal vapor in high vacuum, cathodic atomization, spraying or depositing of a metallic mirror either chemically or electrochemically. Metallisation is effected in such a manner that an unmetallised margin is provided. This metallised plastic foil is then wound on a mandrel of, e. g., 3–5 mm. thickness in such a manner that metal foil and mandrel serving, e. g., as the positive pole of the capacitor are contacted. The metal contact surfaces applied are lying one upon the other on winding. The negative pole of the capacitor is contacted by inserting one or several small contact metal strips in the known manner. A foil wound in such a manner represents one or two capacitor systems, the metal foil being the positive pole. If, e. g., a 5 μ aluminium foil is provided on both sides with a 5 μ lacquer coating having a dielectric constant of 4, and vaporized thereon a 0.35 μ zinc metal electrode on both sides, a capacity of 708×2=1416 pF is obtained per 1 qcm. of foil with a total thickness of 15.5 μ. 706 qcm. of foil contain 1 microfarad occupying a space of 0.109 cc. Foils of the said kind are not only more homogeneous, technically simpler and easier to wind but allow the manufacture of capacitors with a saving of space of more than 300% as compared with the customary static capacitors under equal conditions and equal capacity.

With the metallised foils according to the invention the known effect of healing weak spots in metallised foils used for the manufacture of capacitors can be fully displayed. Each foil contains numerous weak spots which break down at essentially lower voltage as is corresponding to the type of plastic. By exposing a foil of the kind described to the action of high voltage for only a short time the weak spots "burn open" by vaporization of the thin metal layers and the stress is not subjected to a weak spot of smallest size but is about comparable with the stress of the spotless plastic. Thereby it becomes possible to reduce the thickness of the foil considerably, for instance, for at least 50%, the breakdown voltage remaining the same.

So far the thickness of the dielectric spacers was limited due to technical difficulties in the manufacture. The lower limit for paper foils was at 7 μ and for plastic foils above that figure. But the thinner these spacers were the more weak spots were present. Therefore, technically, it was required to combine two or more layers to form one layer of, e. g., 14–22 μ thickness with all the disadvantages of this working method. Contrary thereto according to the present invention it is possible e. g., by the use of reaction products of polyfunctional isocyanates and polyhydroxy compounds to apply homogeneous layers of any desired thickness to metallised foils. Since it is possible to provide a metallised foil with two or several coatings of plastic layers of any desired thickness placed on top of one another by passing the foil through another bath after the first coating, foils with only a few weak spots and of almost any desired thickness up to 0.5 μ and less are obtained, at the maximum possible dielectric strength. In this manner the volume of the capacitor is reduced to about ⅕ to ⅟₃₀ and below as compared with a paper capacitor, capacitance and tension remaining the same. Such capacitors can be ranged within the size of smooth as well as roughened electrolytic capacitors for low and high voltage as can be seen from the following schedule:

| Thickness of dielectric layer (one sided) | cm.² foil for 40 μf. capacitor | Volume of 40 μf. capacitor |
|---|---|---|
| | | cm.³ |
| 1μ | 5,600 | 6.8 |
| 2μ | 11,400 | 14.0 |
| 3μ | 17,000 | 23.5 |
| 4μ | 22,600 | 35.0 |
| 5μ | 28,200 | 48.5 |
| 6μ | 34,000 | 65.0 |
| 7μ | 40,000 | 85.0 |
| 8μ | 45,500 | 110.0 |

Modern electrolytic capacitors with a roughened aluminium surface of 40 μf. and 360 v. tension require a volume of 48.5 ccs.

The importance of static capacitors approximately equal in size to electrolytic capacitors can be readily understood. Electrolytic capacitors among others show the disadvantage of high losses, of e. g. tg$\delta$=0.1 to 0.5 as compared with 0.003–0.012 and below of capacitors of the above described kind. Further, the electrolytic capacitors can be used only for alternating current, whereas the static capacitors can be used for all kinds of current.

According to practical experience it is advantageous to combine two layers of capacitor paper to form a dielectric intermediate layer. According to the invention the breakdown voltage of foils is increased by varnishing the metal foil twice or several times. Whereas a metal foil having been lacquered once of a thickness of, e. g., 7–8 $\mu$ has a breakdown voltage of, e. g. 500 v., a foil of the same thickness obtained by lacquering twice with a 4 $\mu$ layer has a breakdown voltage averaging 700 v. and above. A foil coated 3-times has a breakdown voltage of 750 v. and above. The number of weak spots which is to be removed on regeneration of the foil is greatly reduced, for instance, to less than one third if the foils are varnished twice or several times.

The dielectric single layers applied to the metal foil may consist of one or different plastics.

The temperature required for carrying out condensation of the lacquer is regulated so that the solvents evaporate without forming pores or blisters and condensation proceeds without tension and homogeneously over the whole surface. Foil formation may take place preferably with the use of infrared or dielectric heating to obtain higher working speed. The foil for this purpose is conducted through a heating channel at slowly rising temperatures of, e. g., 50–200° C. within e. g. 1–2 minutes.

A capacitor in the temperature range should display constancy of capacitance and power factor up to the highest possible temperatures. This is attained, e. g., by using polyhydroxy compounds containing more than 9%, e. g., 9.5 up to about 15% OH-groups, or by using 1-chloro-2.4-toluylene-diisocyanate.

By aging, tempering and after-treatment in high vacuum the dielectric values of the foils are improved. Thus it is possible to increase the value of a foil with a tg$\delta$=0.0126 to 0.0027 (800 Hz.).

When using plastics not possessing the required adhesiveness on smooth or bright metal the process is preferably carried out as follows:

Metal foils, for instance, aluminium foils of e. g. 5–6 $\mu$ thickness are roughened on the surface and/or perforated and provided with a plastic coating. A direct contact of the plastic layers applied to both sides is caused by the perforation through the foils. The lacquer by its many contact points adheres to the foil to such an extent that it does not come off.

The adhesiveness of plastic films on metal foils attained thereby is further increased by excluding shrinkage of the drying plastic films as much as possible. This is attained by passing the foils through a heating channel at temperatures rising from 50–200° C. when applying the lacquer. Thereby it is possible to obtain a plastic varnish on the metal foil which is free from or poor in shrinkage.

Preferably two to three layers, one on top of the other, are combined using, for instance, polystyrene of varying polymerisation index ranging from the mesocolloidal to the eucolloidal state. On manufacturing the foil it is preferably caused to age after each dipping at temperatures of 80–200° C. to render the single varnishings poor in shrinkage and to prevent a loosening from the metal foil.

It is also advantageous to use plastics and metal foils with about equal extension coefficients.

The adhesiveness of plastic layers upon metal can be improved by applying to the metal foil a very thin first coating of a well adhering plastic, for instance, on the basis of polyhydroxy compounds and polyisocyanates.

In order to obtain foils of greater thickness with sufficient adhesiveness the foils are passed through calender rolls in and after coming out of the heating channel while applying pressure, the temperature should be e. g. 80–140° C. at which temperature the foils are plastic.

According to the invention all plastics for the manufacture of capacitors that hitherto could not be used can be used now if they are applicable to the metal foil in the desired thickness from a solution or melt, such as, for instance, plastics obtained on the basis of polyethylene, polyisobutylene, aliphatic film-forming fluorine compounds, silicones and the like.

Pigmented foils of high filling capacity, small thickness and sufficient mechanical strength that could hitherto not be manufactured can be manufactured according to the present invention without difficulty, since the filled plastic foil is carried by the metal foil.

The influence of the filling material is very essential. Filling factors of more than 0.3 can be realized only by employing metal carrier foils according to the invention for technical purposes, since foils of the said kind without a carrier are too brittle. A plastic with a dielectric constant of 4 containing 30 percent per volume of rutile brought into a foil yields a mixed dielectric constant of 8.8, whereas a 50 percent per volume filler yields a dielectric constant of 15 and a 60 percent per volume filler yields a dielectric constant of 18.

Suitable lacquer materials for the manufacture of filled lacquer layers according to the invention are plastics obtained on the basis of polyhydroxy compounds and polyfunctional isocyanates, the latter displaying excellent wetting properties besides an appropriate adhesiveness on metal foils, enveloping and isolating each filling particle completely. Materials of the kind described require smaller quantities of solvent for the manufacture of the foil, besides the foils shrink less and are absolutely smooth and homogeneous on the surface.

Rutile with a dielectric constant of approximately 80–120, calcium titanate with a dielectric constant of 160, strontium titanate with a dielectric constant of 340, and barium titanate with a dielectric constant of 800–12000, as well as the corresponding carbonates, display properties which render them particularly suitable as fillers in the manufacture of filled foils, besides the known technical substances of high dielectric constant, for instance, on the basis of magnesium titanate-containing compositions. Choice is made from the viewpoint of highest breakdown voltage and smallest dielectric loss. Barium titanate with the highest dielectric constant has a smaller power factor than calcium or strontium titanate.

The invention is further illustrated by the following examples without being restricted thereto, the parts being by weight.

*Example 1.*—A solution of 100 parts of an anhydrous polyhydroxy compound obtained by condensation from 3 mols of adipic acid and 4 mols of hexanetriol, and 75 parts of a reaction product from 3 mols of 2.4-toluylene-diisocyanate and 1 mol of hexanetriol, is prepared in a mixture of 650 parts of acetic acid ethylester, chlorobenzene, toluene and methylene-chloride, the parts by weight being equal. An aluminium foil of 5 $\mu$ thickness is passed through the said solution and heated in a vertical drying channel at temperatures slowly rising from 30-180° C., whereby polycondensation to the plastic takes place. Dipping and polycondensation is repeated 3-times. A foil of a total thickness of 17 $\mu$ is obtained. The dielectric constant is 4, the power factor 0.0062. Breakdown voltage lies at approximately 1000 v.

After vaporizing a 0.5 $\mu$ zinc layer in vacuum upon both sides of the foil of 40 mm. breadth by leaving a margin of 3 mm. on both sides, the foil is wound on a mandrel of 4 mm. diameter which is contacted with the aluminium foil. As second electrode metal strips are placed upon the vaporized metallised layer. The capacitor obtained in this manner has the following properties: capacitance 0.47 $\mu$F., tg $\delta$=0.068.

Example 2.—A solution of 2% of polystyrene with a polymerisation index of 600 in a mixture of a solvent consisting of equal parts of benzene, toluene and methylene-chloride is applied on a roughened aluminium foil in a thickness of 3 $\mu$, the foil being provided with round holes of 1 mm. diameter at a distance of 4 mm. This foil is passed through a drying channel at slowly rising temperatures, the channel being heated to 30-180° C. Upon this layer a second and, if desired, a third layer of the same thickness with a polymerisation index of 1000, 1200 resp. is applied. After-treatment is effected in the manner described. Upon the foil a 0.5 $\mu$ thick layer is vaporized on both sides in high vacuum at $10^{-4}$ mm. Hg. The foil is then wound on a mandrel of 4 mm. diameter, thereby contacting aluminium foil and mandrel. The vaporized metallic layer is contacted as second electrode by wrapping in a metal strip. After inserting the capacitor into a container of plastic it can be used for high, medium and low frequency.

Capacitors of the said kind replace mica-capacitors and partly also ceramic capacitors. The power factor is smaller than 0.0005 in the high frequency range and has a constancy up to 70° C. approx.

Example 3.—200 parts of purified rutile are ground in an oscillating mill for 24 hours and homogenized with 60 parts of the reaction product obtained from 3 mols of adipic acid+4 mols of hexanetriol with 125 parts of chlorobenzene and 125 parts of methylene-chloride. Then 60 parts of a reaction product obtained from 3 mols of 2.4-toluylene-diisocyanate and 1 mol of hexanetriol are added and mixed for 15 minutes. This solution is applied to both sides of a 6 $\mu$ thick aluminium foil and condensed for 1 minute in a vertical heating channel at 120-150° C. Upon the dielectric spacer of about 9 $\mu$ thickness with a dielectric constant of 11 a 0.5 $\mu$ thick copper layer is applied. In this manner a capacitor with a breakdown voltage of more than 400 volt (after regeneration) and a power factor smaller than 0.01 is obtained. The volume of the new capacitor is less than $\frac{1}{10}$ of a paper capacitor, capacity and operating voltage being the same.

Example 4.—550 parts of barium titanate are ground for 36 hours in the oscillating mill with 100 parts of a reaction product obtained from 3 mols of adipic acid and 4 mols of trimethylolpropane, 225 parts of chlorobenzene and 225 parts of methylene-chloride. After the addition of 100 parts of a reaction product obtained from 3 mols of 2.4-toluylene-diisocyanate and 1 mol of hexanetriol the solution is applied to an aluminium foil of 5 $\mu$ thickness. The foil has a dielectric constant of 18.6 and a tg $\delta$ of 0.0078.

The thickness of the coating applied to the foil can be reduced to 5-6 $\mu$ by dilution with solvents. Foils of the said kind are preferably used for medium and lower voltage capacitors. The said capacitors are approximately the size of electrolytic capacitors or smaller.

Example 5.—A 30% solution of a silicone obtained from a mixture of mono-methyl-silicon-trichloride and dimethyl-silicon-dichloride—the dimethylsilicon-dichloride being in excess—in acetic acid ethyl ester is applied to an aluminium foil. Condensation is effected by passing the foil through the solution in a continuous working process at temperatures of 50-280° C. The foil obtained in this manner is further treated as indicated in Example 1. Thus capacitors are obtained which at 150° C. and 800 Hz have a power factor smaller than 0.003. They display the known advantage of silicone plastics regarding their electrical and dielectrical properties.

We claim:

1. Foil for electrical equipment consisting of a metal foil coated at least on one side with at least one layer of dielectric plastic firmly adhering thereto consisting of the reaction product of a polyisocyanate and an organic polyhydroxy compound, a second metallic layer being superimposed on and firmly adhering to said plastic layer.

2. Foil for electrical equipment consisting of a metal foil coated at least on one side with at least one layer of dielectric plastic firmly adhering thereto consisting of the reaction product of a polyisocyanate and an organic polyhydroxy compound containing more than 9.5 up to 15 per cent by weight of hydroxyl groups, a second metallic layer being superimposed on and firmly adhering to said plastic layer.

3. Foil for electrical equipment consisting of a metal foil coated at least on one side with at least one layer of dielectric plastic firmly adhering thereto consisting of the reaction product of 100 parts by weight of a polyester from three mols of adipic acid and four mols of hexanetriol with 75 parts of a polyisocyanate obtained from three mols of toluylene-diisocyanate and one mol hexanetriol, a second metallic layer being superimposed on and firmly adhering to said plastic layer.

4. Foil for electrical equipment as claimed in claim 1 wherein the thickness of the metal foil does not exceed about 6/$\mu$, the layer of plastic is no more than 10/$\mu$ in thickness and the second metal layer superimposed thereon is no thicker than 1/$\mu$.

5. Foil for electrical equipment as claimed in claim 1, wherein said dielectric plastic layer consists of a non-polar plastic.

6. Foil for electrical equipment as claimed in claim 1 wherein said dielectric plastic layer is toothed with said metal foil.

7. Foil for electrical equipment as claimed in claim 1 wherein said dielectric plastic layer contains fillers with a high dielectric constant.

8. A capacitor comprising a metal core having at least one foil wound about it, said foil consisting of a metal foil element coated at least on one side with at least one layer of dielectric plastic firmly adhering thereto consisting of the reaction product of a polyisocyanate and an organic polyhydroxy compound, a second metallic layer being superimposed on and firmly adhering to said plastic layer, said metal foil element being positioned in electrical contact with said metal core, and at least one electrode positioned in electrical contact with said second metallic layer.

HANNS ARLEDTER.
RUDOLF ENGELHARDT.

REFERENCES CITED

The following references are of record in the file of this patent:

UNITED STATES PATENTS

| Number | Name | Date |
| --- | --- | --- |
| 1,890,313 | Caine | Dec. 6, 1932 |
| 2,424,853 | Safford | July 29, 1947 |
| 2,430,479 | Pratt et al. | Nov. 11, 1947 |
| 2,436,222 | Neal et al. | Feb. 17, 1948 |
| 2,439,369 | Nicol | Apr. 6, 1948 |
| 2,449,613 | Miller et al. | Sept. 21, 1948 |
| 2,497,066 | Brennan | Feb. 14, 1950 |

OTHER REFERENCES

Schlack (Patent Appl.) 397,741 published Apr. 20, 1943.

DeBell, German Plastics, published by Murray, Cambridge, Mass., 1946, pp. 300–316.